US012686107B2

(12) United States Patent
Smith

(10) Patent No.: US 12,686,107 B2
(45) **Date of Patent: *Jul. 21, 2026**

(54) HAMMER WITH LINEARLY ADJUSTABLE CLAW

(71) Applicant: Scott L. Smith, Saint Johns, FL (US)

(72) Inventor: Scott L. Smith, Saint Johns, FL (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/226,919

(22) Filed: Jul. 27, 2023

(65) Prior Publication Data

US 2023/0398673 A1 Dec. 14, 2023

Related U.S. Application Data

(63) Continuation of application No. 17/120,922, filed on Dec. 14, 2020, now Pat. No. 11,759,934.

(51) Int. Cl.
*B25D 1/04* (2006.01)

(52) U.S. Cl.
CPC .................................... *B25D 1/045* (2013.01)

(58) Field of Classification Search
CPC . B25D 1/045; B25D 1/16; B25D 1/00; B25D 1/02; B25D 1/04; B25D 1/05
See application file for complete search history.

(56) References Cited

U.S. PATENT DOCUMENTS 1,132,879 A * 3/1915 Rairden ................. B25D 1/045 254/26 E
1,410,407 A 3/1922 Luttrell
2,340,140 A 1/1944 Owens
4,314,593 A 2/1982 Schwartz
4,422,620 A 12/1983 Nitzberg
5,022,137 A 6/1991 Sorensen et al.
6,568,667 B1 5/2003 Hall
(Continued)

FOREIGN PATENT DOCUMENTS

CN 103465227 A 12/2013

OTHER PUBLICATIONS

Written Opinion of the International Searching Authority for PCT/US2021/061563 established by the ISA/AU completed on Feb. 1, 2022.

(Continued)

*Primary Examiner* — Tyrone V Hall, Jr.
(74) *Attorney, Agent, or Firm* — Goldstein Law Offices, P.C.

(57) ABSTRACT

A hammer includes a handle, a head assembly affixed to the handle, and a claw assembly slidably disposed on the handle. The handle includes apertures interspaced linearly along the length of the handle. The head assembly includes a throat and a striking face. The claw assembly includes a claw, an annular sleeve slidably disposed around the handle for enabling linear adjustment of the claw assembly along the length of the handle, and a ratcheting lever coupled to the sleeve for adjusting the position of the claw relative to the head assembly during operation. The ratcheting lever includes a spring-biased locking pin for removably engaging any one of the apertures to selectively secure the claw assembly to the handle in a desired position and a depressible release arm for releasing the spring-biased locking pin from the apertures to enable the claw assembly to slide along the length of the handle.

14 Claims, 9 Drawing Sheets

(56) References Cited

U.S. PATENT DOCUMENTS

| | | | |
|---|---|---|---|
| 6,827,333 B1 | 12/2004 | Lutz | |
| 6,961,973 B1 | 11/2005 | Smith | |
| 8,177,192 B1 | 5/2012 | Taylor et al. | |
| 10,967,494 B2 | 4/2021 | Smith | |
| 2003/0141644 A1 | 7/2003 | Thomas | |
| 2005/0184439 A1 | 8/2005 | Janson et al. | |
| 2006/0226588 A1 | 10/2006 | Khachatoorian et al. | |
| 2010/0019214 A1 | 1/2010 | Cole | |
| 2014/0175352 A1 | 6/2014 | Smith | |
| 2018/0001459 A1* | 1/2018 | Smith | B25D 1/045 |

OTHER PUBLICATIONS

International Preliminary Report on Patentability of the International Preliminary Examining Authority for PCT/US2021/061563 established by the IPEA/AU completed on Sep. 1, 2022.

* cited by examiner

HAMMER WITH LINEARLY ADJUSTABLE CLAW

CROSS-REFERENCE TO RELATED APPLICATIONS

This is a continuation of U.S. nonprovisional patent application Ser. No. 17/120,922, filed Dec. 14, 2020. The foregoing application is herein incorporated by reference in its entirety.

TECHNICAL FIELD

The present disclosure relates generally to claw hammers. More particularly, the present disclosure relates to a claw hammer having a claw that is linearly adjustable with respect to the head of the hammer to improve leverage and range of prying for nail extraction.

BACKGROUND

Conventional claw hammers are primarily used for pounding nails into an object or extracting nails from an object. Conventional claw hammers resemble the letter "T" and include a vertical, longitudinally extending handle, a head assembly includes a striking face and a curved two-pronged claw opposite the striking face. The claw curves downwardly away from the head assembly and toward the handle and splits in the middle forming a "V" shaped gap. Typically, the claw increases in thickness from the free end, or ends of the prongs toward the head assembly. The gap is the part of the claw that is commonly used for extracting nails from objects, such as wood. The curved claw in conjunction with the handle is used to gain leverage when extracting a nail.

The curvature and length of the claw varies among hammers. By way of example, the claw of a framing hammer may feature less curvature than the claw curvature of a finishing hammer and therefore does not have as much leverage for removing nails. While claws are useful for fully extracting short nails in one fluid motion, long nails pose challenges. A claw may not have sufficient length and range of motion to fully extract the nail. The claw may be adequate only to partially remove the nail, requiring a user to then struggle to extract the remaining embedded portion of the nail, such as by employing another tool, like pliers, applying a considerable pulling force, and/or by applying a board, such as a 2×4, to raise the height of the fulcrum point. Although a hammer could be provided with an extremely long curved claw sufficient to extract even the longest nail, such a hammer would be extremely cumbersome to wield.

According, there is a need in the art for a claw hammer enabling the extraction of longer nails from objects.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a hammer with a linearly adjustable claw for gaining added leverage to remove a longer nail from an object. Accordingly, the present disclosure provides a hammer including an elongated handle, a head assembly affixed the elongated handle, and a claw assembly slidably disposed on the elongated handle. The elongated handle includes a proximal end, a distal end, a front side, a rear side, and a plurality of apertures on the rear side of the handle that are interspaced linearly along the length of the handle. The head assembly is affixed to the distal end of the elongated handle and includes a head body having a top end, a bottom end, a front end, a rear end, a throat protruding outwardly from the front end of the head body, and a striking face protruding outwardly from the throat. The claw assembly includes a claw body having a top end, a bottom end, a proximal end slidably coupled to the rear end of the head body, a distal end, a curved two-pronged claw protruding outwardly from the distal end of the claw body, a sleeve positioned annularly around the elongated handle enabling sliding of the claw assembly along the length of the elongated handle and linear adjustment of the curved two-pronged claw relative to the head assembly, and a ratcheting lever coupled to the sleeve. The ratcheting lever includes a spring-biased locking pin configured to removably engage any one of the plurality of apertures to selectively secure the curved two-pronged claw in a desired position along the length of the elongated handle and a depressible release arm, which, upon depression, causes compression of the spring-biased locking pin to release the spring-biased locking pin from any one of the plurality of apertures, thereby enabling the claw assembly to slide along the length of the handle. Enabling adjustment of the linear position, or height, of the claw assembly with respect to the head assembly allows a user to engage the head of a nail with the claw regardless of the nail's length and/or the height at which the nail protrudes from an object. In this way, the linear adjustable claw may provide added leverage on a nail and facilitate extraction as well as increase the range in which a user may pry a nail from an object.

Another aspect of an example embodiment in the present disclosure is to provide a hammer with a linearly adjustable claw that may easily be ratcheted or adjusted. Accordingly, the sleeve comprises a first aperture and a bore through which the spring-biased locking pin extends, the release arm includes a second aperture through which the spring-biased locking pin extends, and the spring-biased locking pin includes a pin body extending through the first aperture and second aperture. The pin body includes a first end positioned within the bore, a second end positioned outside of the sleeve and the release arm, a collar disposed around the second end and securing the pin body to the release arm and within the bore, a locking tooth disposed on the first end for engaging any one of the plurality of apertures, and a spring extending annularly around the pin body. The spring is positioned within the bore between the first aperture and the locking tooth and includes a diameter larger than a diameter of the first aperture. The spring is biased toward the rear side of the elongated handle. The locking tooth includes a diameter substantially equal to or larger than the diameter of the spring. Upon depression of the release arm, the release arm pulls the pin body out of the bore via the collar, driving the locking tooth toward the first aperture away from the rear side of the elongated handle and out of any one of the plurality of apertures, thereby releasing the claw assembly from the elongated handle and causing the spring to compress between the first aperture and the locking tooth forming an elastic potential energy toward the rear side of the elongated handle. In this way, when the release arm is released from being depressed, the spring drives the locking tooth back toward the rear side of the elongated handle and into any one of the plurality of apertures to secure the claw assembly in position along the elongated handle.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
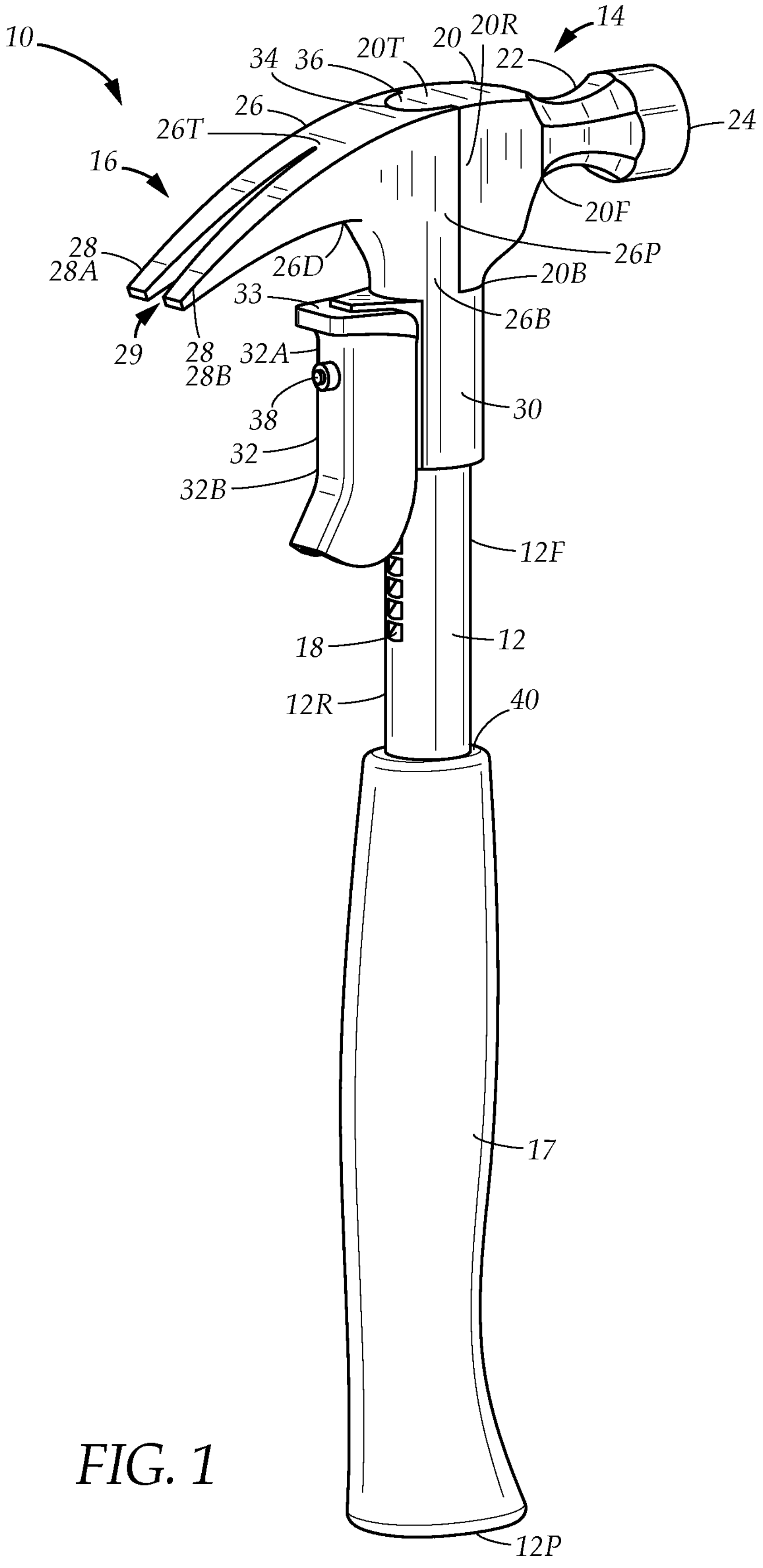
FIG. 1 is a perspective view of the hammer with the linearly adjustable claw according to one embodiment of the present disclosure.
Figure 2:
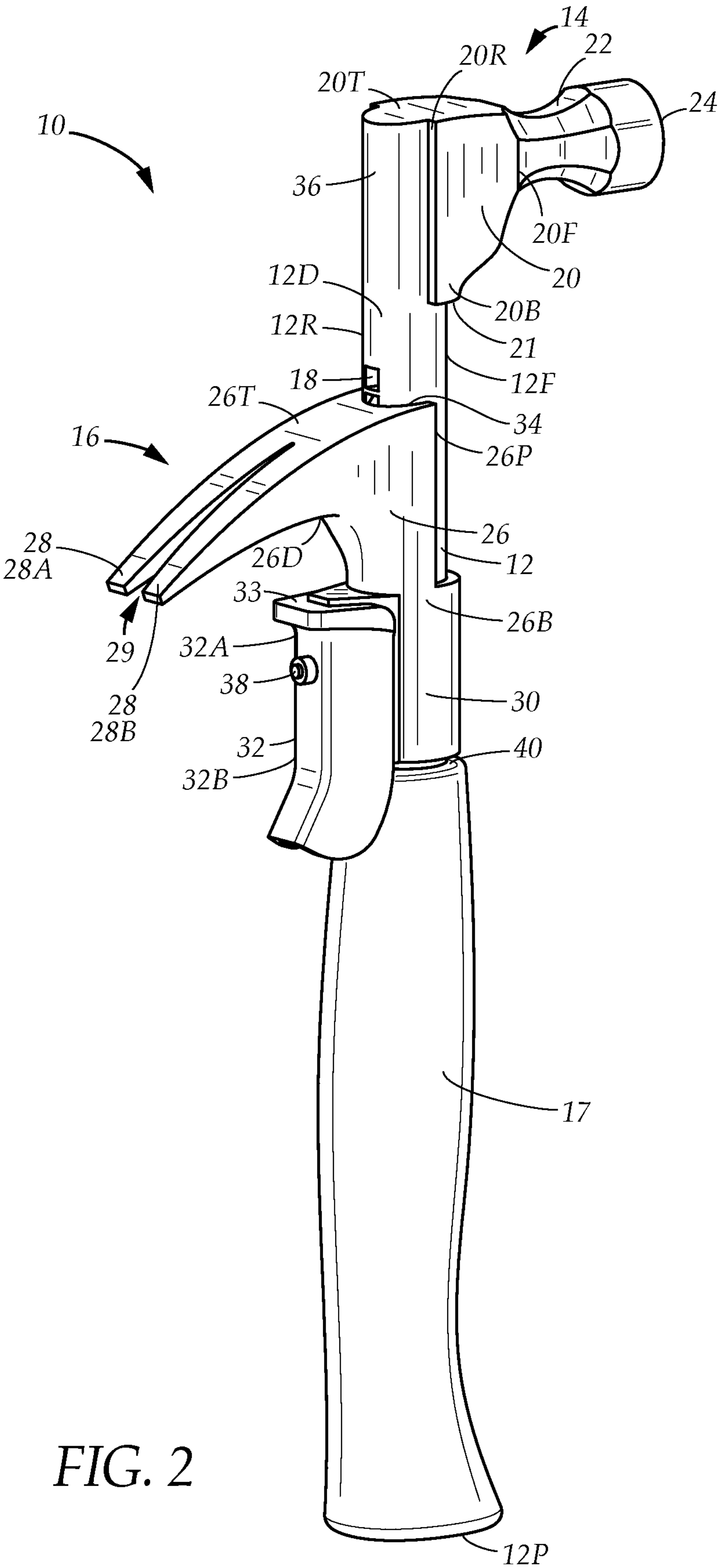
FIG. 2 is a perspective view of the hammer with the linearly adjustable claw adjusted along the elongated handle of the hammer, illustrating a position in which the claw assembly of the hammer may be adjusted according to one embodiment of the present disclosure.

FIG. 1 and FIG. 2 illustrate a hammer 10 comprising an elongated handle 12, a head assembly 14 affixed to the elongated handle 12, and a claw assembly 16 slidably disposed on the elongated handle 12. The elongated handle 12 includes a proximal end 12P, a distal end 12D opposite the proximal end 12P, a front side 12F, a rear side 12R opposite the front side 12F, a grip 17 extending annularly around the proximal end 12P of the elongated handle 12, and a plurality of apertures 18 interspaced linearly along the length of the elongated handle 12 between the grip 17 and the distal end 12D. The plurality of apertures 18 are disposed on the rear side 12R of the elongated handle 12.

The head assembly 14 is affixed to the distal end 12D of the elongated handle 12. The head assembly 14 includes a head body 20 having a top end 20T, a bottom end 20B opposite the top end 20T, a front end 20F, a rear end 20R opposite the front end 20F, a throat 22 protruding outwardly from the front end 20F of the head body 20 and extending away from the front side 12F of the elongated handle 12, and a striking face 24 protruding outwardly from the throat 22. Note, the striking face 24 is circular in shape, but may be rectangular or any other shape.

The claw assembly 16 is slidably disposed on the distal end 12D of the elongated handle 12. The claw assembly 16 includes a claw body 26 having a top end 26T, a bottom end 26B opposite the top end 26T, a proximal end 26P, a distal end 26D opposite the proximal end 26P, a curved two-pronged claw 28 protruding outwardly from the distal end 26D and extending away from the rear side 12R of the elongated handle 12, a sleeve 30 extending downwardly from the bottom end 26B, and a ratcheting lever 32 coupled to the sleeve 30 for adjusting the position of the claw assembly 16 along the length of the elongated handle 12.

The proximal end 26P of the claw body 26 is slidably coupled to the rear end 20R of the head body 20. The claw body 26 includes an inwardly extending recess 34 on its proximal end 26P that extends longitudinally along the length the proximal end 26P. The head body 20 includes an outwardly extending projection 36 on its rear end 20R that extends longitudinally along the length the rear end 20R. The projection 36 fits within the recess 34 like a joint and is slidably disposed within the recess 34 to enable the claw body 26 to slide longitudinally, or linearly, along the length of the head body 20. In embodiments, the rear side 12R of the elongated handle 12 is substantially the same size and shape as the projection 36 such that the recess 34 may fit over the rear side 12R of the elongated handle 12 in a joint-like connection, allowing the recess 34 to slide over the elongated handle 12 when the claw assembly 16 is linearly adjusted along the length of the elongated handle 12. The joint-like connection formed by the projection 36 and recess 34, and the rear side 12R of the elongated handle 12 and the recess 34 prevents the claw assembly 16 from rotating loosely about the elongated handle 12 so as to keep the claw assembly 16 along a linear path when the claw assembly 16 is adjusted along the length of the elongated handle 12. The bottom end 20B of the head body 20 defines a stop lip 21 extending outwardly relative to the elongated handle 12 to stop the sleeve 30 at the distal end 12D of the elongated handle 12 when the claw assembly 16 is being adjusted therealong. The stop lip 21 stops the sleeve 30 in position on the distal end 12D to align the claw assembly 16 with the head assembly 14 such that the top end 26T of the claw body 26 is flush with the top end 20T of the head body 20 in a static position, or non-adjusted position.

The curved two-pronged claw 28 has two prongs 28A, 28B that form a v-shaped gap 29 including a vertex. The sleeve 30 is positioned annularly around the elongated handle 12 enabling sliding of the claw assembly 16 along the length of the elongated handle 12 and linear adjustment of the curved two-pronged claw 28 relative to the head assembly 14. The ratcheting lever 32 includes a first end 32A, a second end 32B opposite the first end 32A, and a spring-biased locking pin 38 configured to removably engage any one of the plurality of apertures 18 to selectively secure the curved two-pronged claw 28 in a desired position along the length of the elongated handle 12. In embodiments, the ratcheting lever 32 includes a flange 33 extending outwardly from the first end 32A. The flange 33 extends outwardly to a point past the vertex of the v-shaped gap 29. During extraction of a nail using the curved two-pronged claw 28, the head of the nail may bear against the flange to provide further leverage in extracting the nail.

The grip 17 defines a stop shoulder 40 extending annularly around the elongated handle 12. The stop shoulder 40 includes a diameter substantially equal to or larger than a diameter of the sleeve 30 to stop the sleeve 30 thereon and prevent the claw assembly 16 from sliding further along the elongated handle 12.

Referring now to FIG. 6, FIG. 7, FIG. 8, and FIG. 9, the ratcheting lever 32 further includes a depressible release arm 42 extending outwardly from the second end 32B of the ratcheting lever 32 and away from the rear side 12R of the elongated handle 12. In embodiments, the release arm 42 extends outwardly at an obtuse angle θ with respect to the second end 32B. Upon depression, the release arm 42 causes the spring-biased locking pin 38 to release from, or disengage, any one of the plurality of apertures 18, thereby enabling the claw assembly 16 to slide linearly along the length of the elongated handle 12.

The sleeve 30 comprises a first aperture 44 and a bore 46 through which the spring-biased locking pin 38 extends. The bore 46 includes a larger diameter than the first aperture 44. The ratcheting lever 32 includes a second aperture 48 adjacent to the first end 32A thereof that is aligned with, or co-planar with, the first aperture 44. The spring-biased locking pin 38 includes a pin body 50 extending through the first aperture 44 and second aperture 48. The pin body 50 includes a first end 50A positioned within the bore 46, a second end 50B opposite the first end 50A that is positioned outside of the sleeve 30 and the ratcheting lever 32, a collar 52 disposed on the second end 50B, a locking tooth 54 disposed on the first end 50A for insertion into and engaging any one of the plurality of apertures 18, and a spring 56 extending annularly around the pin body 50.

The collar 52 secures the ratcheting lever 32 to the sleeve 30. The collar 52 also secures the pin body 50 to the ratcheting lever 32, holding the pin body 50 within the bore 46. In embodiments, the collar 52 is affixed to the second end 50B of the pin body 50. In other embodiments, the collar 52 is threadably engaged with the second end 50B, such that it may be removed from the second end 50B to allow disassembly of the ratcheting lever 32. In some embodiments, the collar is affixed to the second end 50B of the pin body 50 and the ratcheting lever 32.

The spring 56 is positioned within the bore 46 between the first aperture 44 and the locking tooth 54. The spring 56 includes a diameter larger than a diameter of the first aperture 44 such that the spring 56 does not inadvertently egress out of the first and second apertures 44, 48 during operation. The spring 56 is biased toward the rear side 12R of the elongated handle 12. The locking tooth 54 includes a diameter substantially equal to or larger than the diameter of the spring 56 such that the locking tooth 54 may engage the spring 56 when extended from the bore 46.

When the release arm 42 is depressed, the ratcheting lever 32 pulls the pin body 50 out of the bore 46 by way of the collar 52. Indeed, when depressed, the release arm 42 pivots toward the elongated handle 12 causing the first end 32A of the ratcheting lever 32 to pivot away from the elongated handle 12. In turn, the first end 32A moves the collar 52 along with it, and the collar 52 pulls the pin body 50 out of the bore 46. As the pin body 50 is pulled out of the bore 46, the locking tooth 54 is driven toward the first aperture 44 and away from the rear side 12R of the elongated handle 12 such that the locking tooth 54 is pulled out of, or disengaged from, any one of the plurality of apertures 18, thereby releasing the claw assembly 16 from the elongated handle 12.

When driven toward the first aperture 44, the locking tooth 54 compresses the spring 56 between the first aperture 44 and the locking tooth 54 forming an elastic potential energy toward the rear side 12R of the elongated handle 12. In this way, when the release arm 42 is released from a depressed state, the elastic potential energy is converted to kinetic energy on the locking tooth 54 such that the spring 56 drives the locking tooth 54 back toward the rear side 12R of the elongated handle 12 and into any one of the plurality of apertures 18, thereby securing the claw assembly in position along the elongated handle 12. Note, the spring 56 drives the locking tooth 54, which pulls the pin body 50 and the collar 52. As the pin body 50 is pulled back into the bore 46 and the locking tooth 54 is driven into any one of the plurality of apertures 18, the collar 52 pulls the ratcheting lever 32 back toward the elongated handle 12 and against the sleeve 30, returning the release arm 42 to its undepressed state.

The plurality of apertures 18 are evenly spaced apart and coplanar relative to one another. Each of the plurality of apertures 18 defines a distinct height adjustment of the claw assembly 16 relative to the head assembly 14 such that when the spring-biased locking pin 38 is engaged with any one of the plurality of apertures 18, the claw assembly 16 is at a different height relative to the head assembly 14 than when the spring biased locking pin is engaged with any of the other plurality of apertures 18. In embodiments, each of the plurality of apertures 18 includes a shape complimentary to the shape of the locking tooth 54 to receive the locking tooth 54 flush therein.

Figure 3:
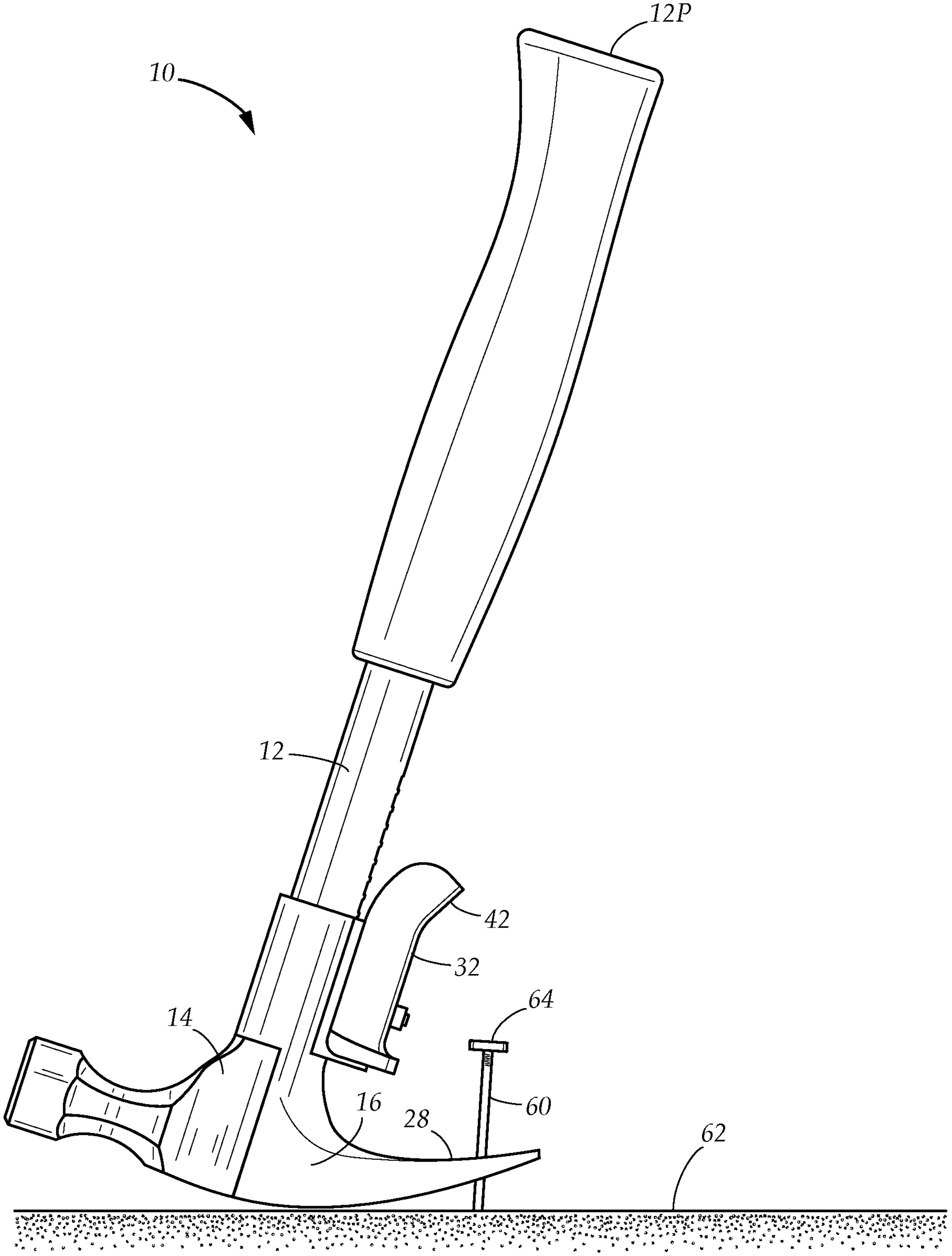
FIG. 3 is a perspective view of the hammer in use to remove a nail, illustrating the claw assembly in its static position on the hammer according to one embodiment of the present disclosure.
Figure 4:
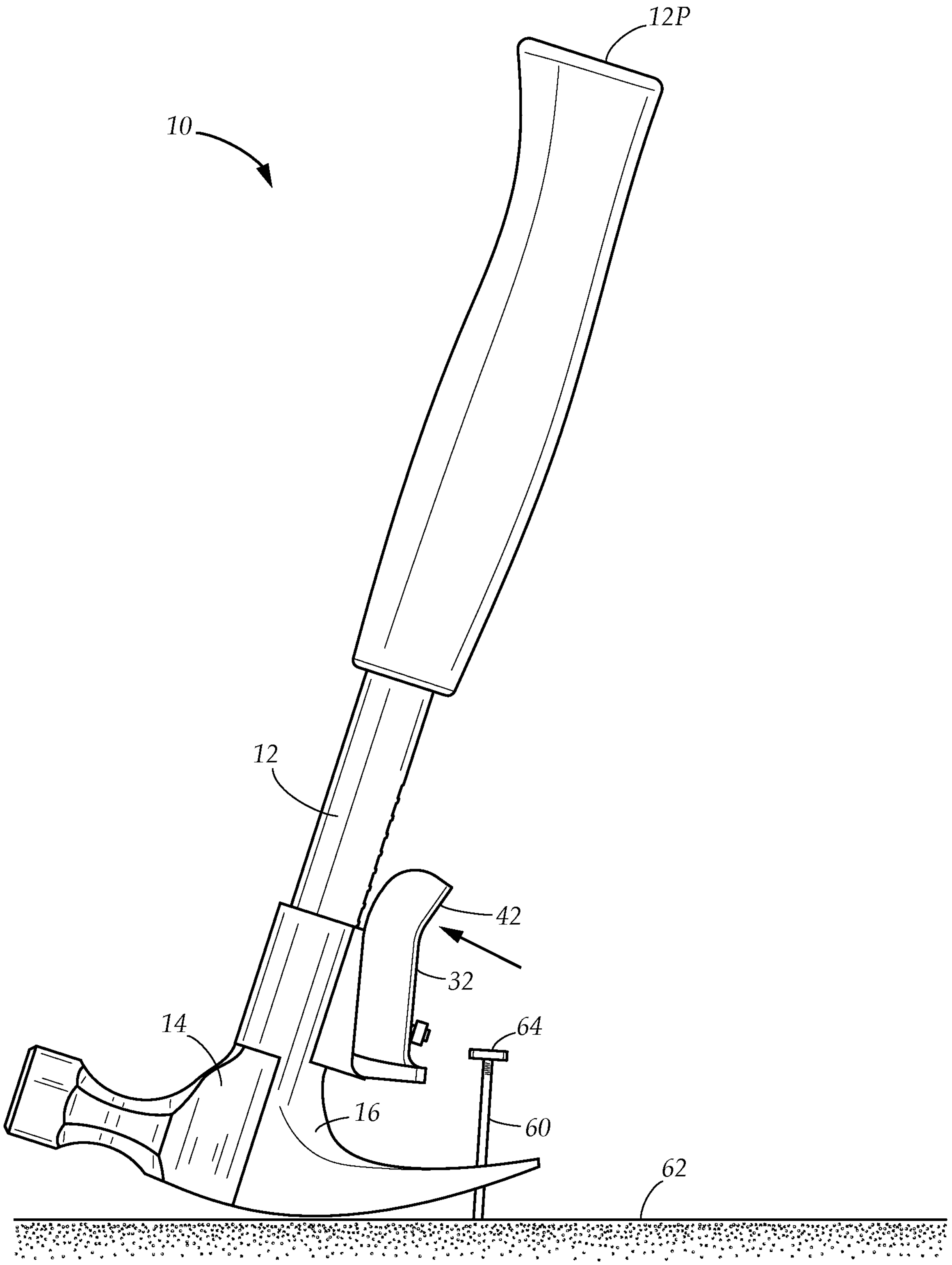
FIG. 4 is a perspective view of the hammer in use to remove a nail, illustrating the release arm of the ratcheting lever in a depressed state to release the spring-biased locking pin and enable adjustment of the claw assembly along the length of the elongated handle according to one embodiment of the present disclosure.
Figure 5:
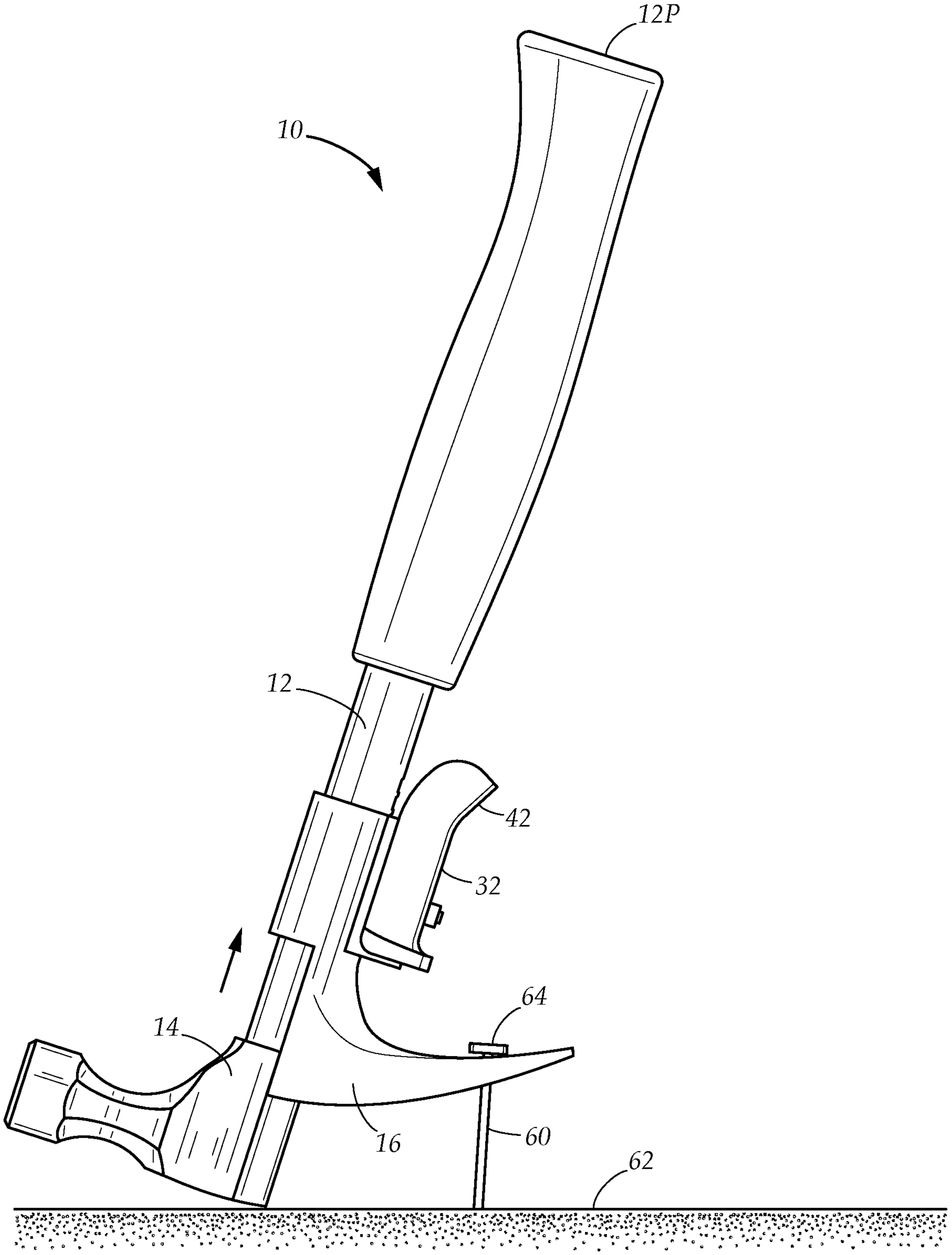
FIG. 5 is a perspective view of the hammer in use to remove a nail, illustrating the claw assembly moved along the length of the elongated handle to adjust its height relative to the head assembly and enable engagement of the two-pronged claw with a longer nail according to one embodiment of the present disclosure.
Figure 6:
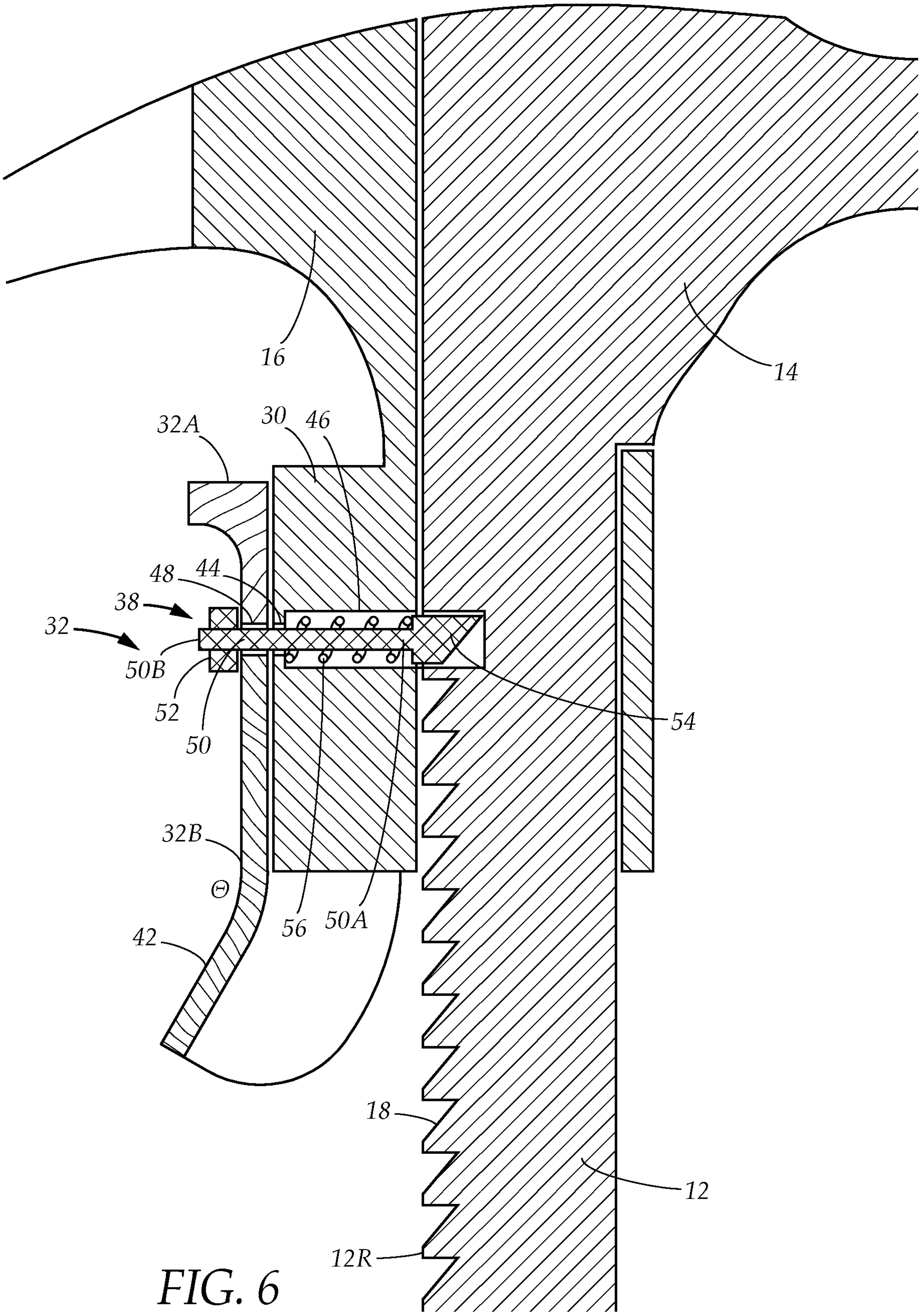
FIG. 6 is a close-up cross-sectional view of the hammer with the claw assembly in a static position, illustrating the configuration of the ratcheting lever and the spring-biased locking pin relative to the sleeve when the release arm has not depressed and further illustrating the engagement of the spring-biased locking pin with one of the plurality of apertures when the release arm has not been depressed according to one embodiment of the present disclosure.
Figure 7:
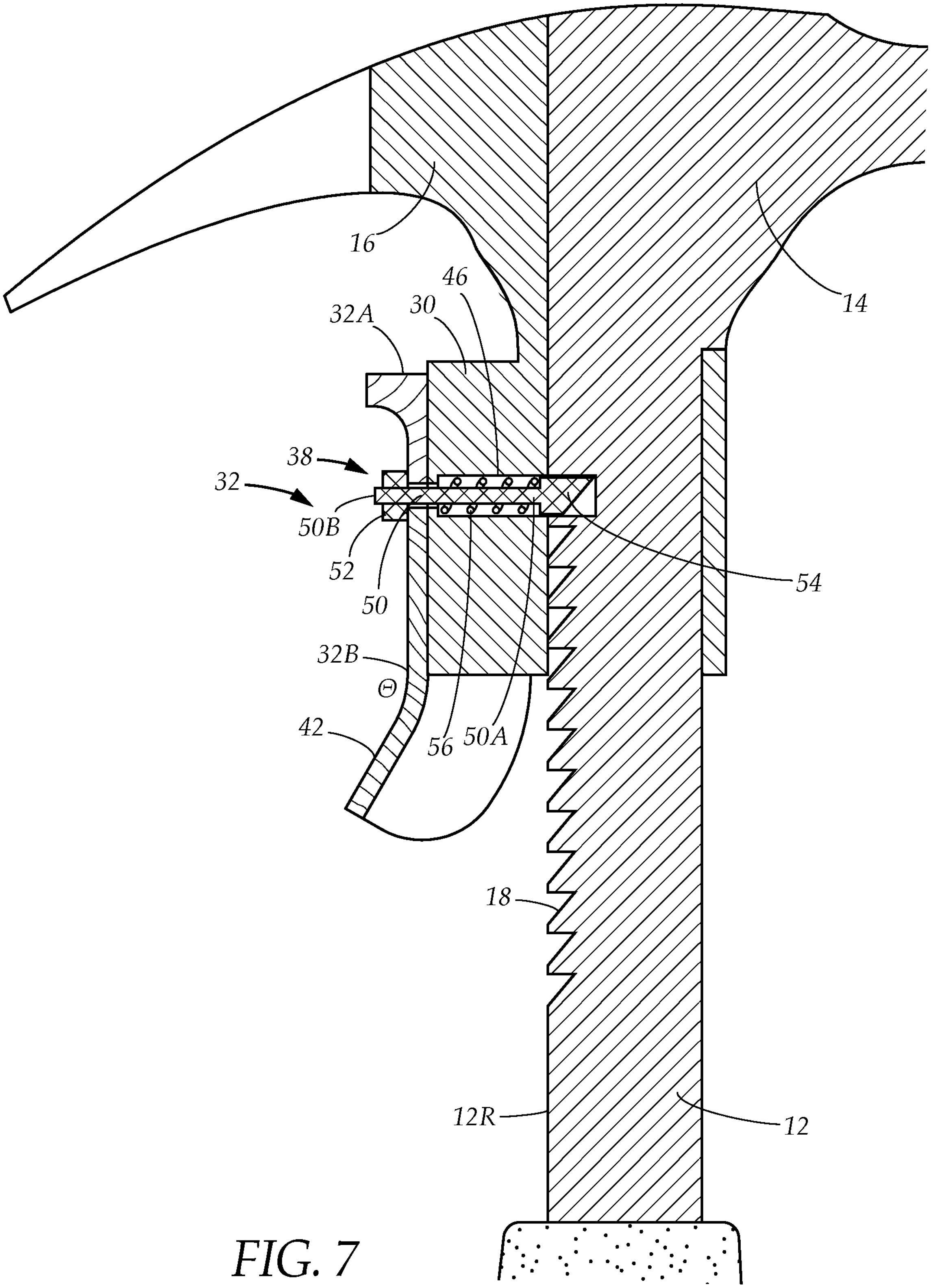
FIG. 7 is a cross-sectional view of the hammer with the claw assembly in a static position, illustrating the configuration of the ratcheting lever and the spring-biased locking pin relative to the sleeve when the release arm has not been depressed and further illustrating the engagement of the spring-biased locking pin with one of the apertures when the release arm has not been depressed according to one embodiment of the present disclosure.
Figure 8:
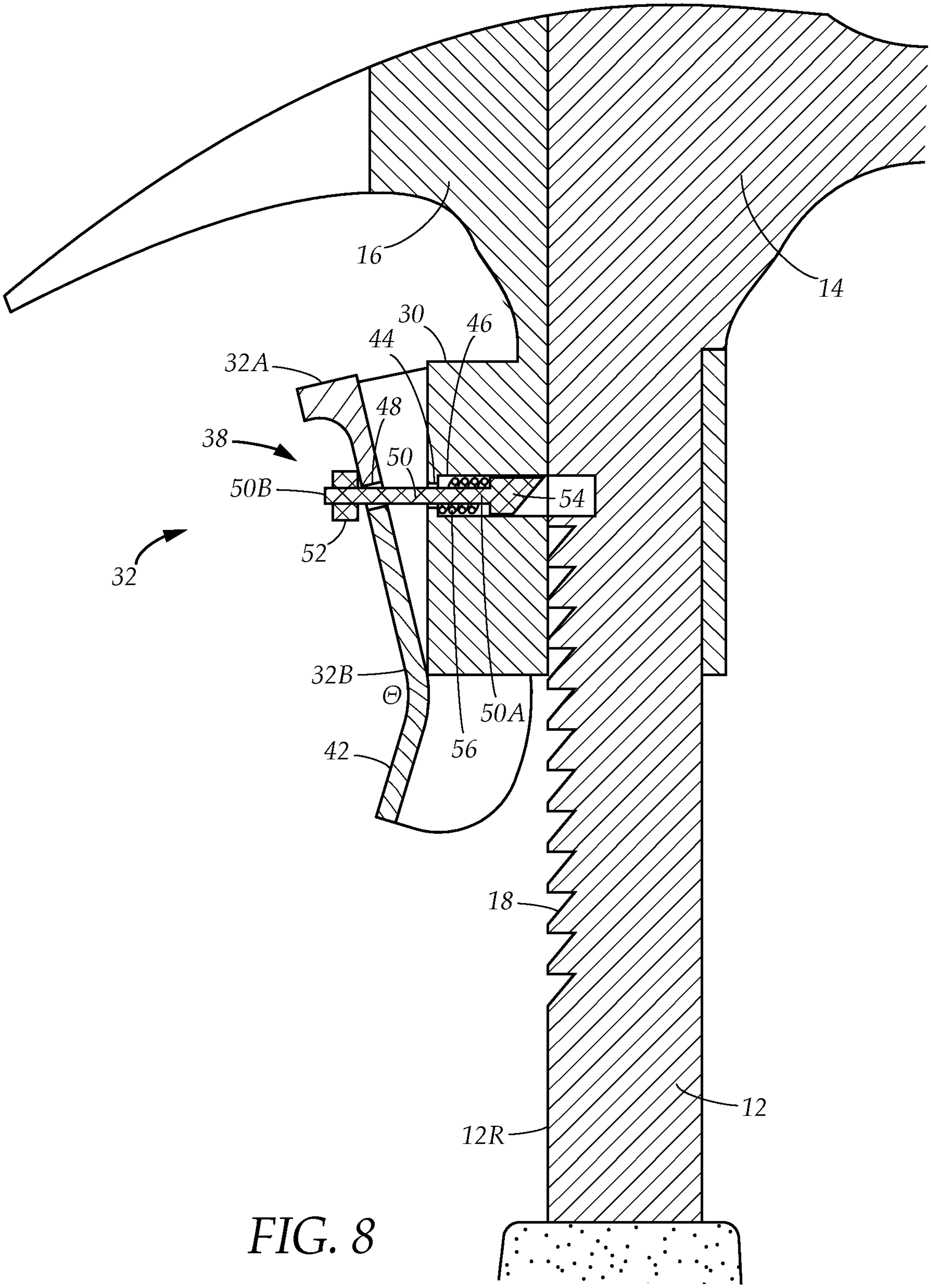
FIG. 8 is a cross-sectional view of the hammer with claw assembly in static position, illustrating the configuration of the ratcheting lever and the spring-biased locking pin relative to the sleeve when the release arm has been depressed and further illustrating the spring-biased locking pin released from one of the apertures after the release arm has been depressed to enable the claw assembly to be adjusted from its static position according to one embodiment of the present disclosure.
Figure 9:
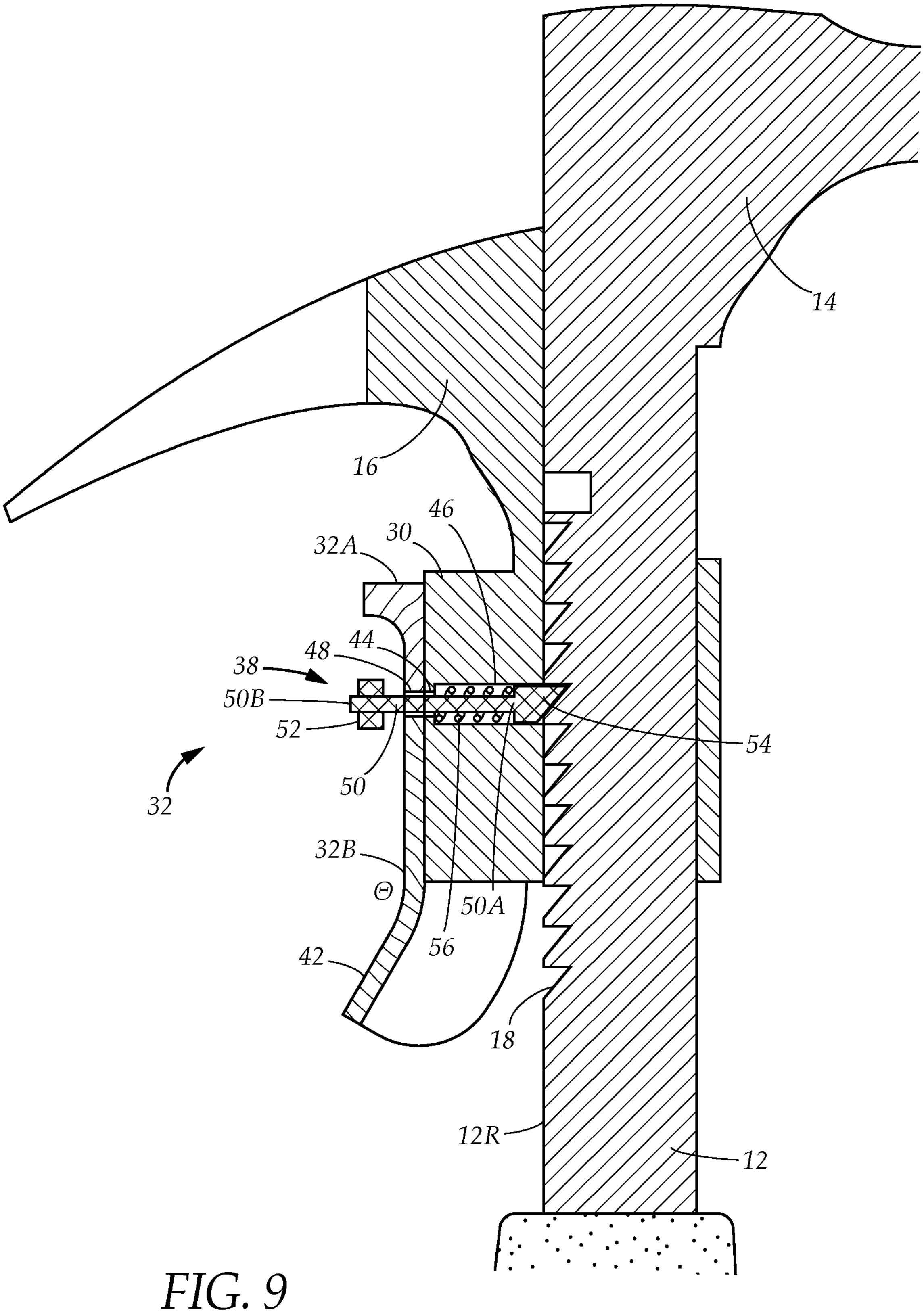
FIG. 9 is a cross-sectional view of the hammer adjusted along the length of the elongated handle from its static position, illustrating the spring-biased locking pin engaging one the plurality of apertures to secure the claw assembly at a height that is different than the head assembly according to one embodiment of the present disclosure.

Referring now to FIG. 3, FIG. 4, and FIG. 5, in one operation of the hammer to extract an elongated nail 60 from a surface 62, the nail 60 is placed in the curved two-pronged claw 28 of the claw assembly 16 while the claw assembly 16 is in its static position. The nail 60 is placed in the two-pronged claw 28 as one would normally place the claw of a hammer when extracting a nail. However, since the nail is longer than the average nail, the curved two-pronged claw 28 cannot gain leverage on the nail head 64. Accordingly, to elevate the claw assembly 16 to gain leverage on the nail head 64, a user depresses the release arm 42 of the ratcheting lever 32 towards the elongated handle 12, or in the direction illustrated by the arrow in FIG. 4. Upon depression of the release arm 42, the claw assembly 16 ratchets linearly along the length of the elongated handle 12 toward the proximal end 12P of the elongated handle 12, or upwardly away from the surface 62 and the head assembly 14 as shown by the arrow in FIG. 5. By ratcheting linearly along the length of the elongated handle 12, the claw assembly 16 adjusts the curved two-pronged claw 28 so that the curved two-pronged claw 28 makes contact with the nail head 64, thereby allowing a user to gain leverage on the nail 60 and extract the nail 60 from the surface 62. Note, the head assembly 14 remains static and against the surface 62 during adjustment and ratcheting of the claw assembly 16. Indeed, the head assembly 14 remains as the fulcrum over which leverage is gained by the elevated claw assembly 16 to extract the elongated nail 60.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a hammer with a linearly adjustable claw. The disclosure is illustrated by example in the drawing figures, and throughout the written description. It should be understood that numerous variations are possible, while adhering to the inventive concept. Such variations are contemplated as being a part of the present disclosure.

What is claimed is:

1. A hammer with a linearly adjustable claw, comprising:

an elongated handle including a proximal end, a distal end, a front side, a rear side, and a plurality of apertures interspaced along the elongated handle;

a head assembly affixed to the distal end of the elongated handle, the head assembly including a head body, a throat protruding outwardly from the head body and extending away from the elongated handle, and a striking face protruding outwardly from the throat;

a claw assembly slidably disposed on the elongated handle, the claw assembly including a claw body slidably coupled to the head body, a curved two-pronged claw protruding outwardly from the claw body and extending away from the elongated handle, the curved-two pronged claw forming a gap between the two prongs, a sleeve coupled to the claw body and positioned annularly around the elongated handle, the sleeve comprising a first aperture and a bore through which a spring-biased locking pin extends, and the claw assembly further comprising a ratcheting lever coupled to the sleeve, the ratcheting lever including the spring-biased locking pin configured to removably engage any one of the plurality of apertures, a second aperture through which the spring-biased locking pin extends, and a depressible release arm extending outwardly from the ratcheting lever and extending away from the elongated handle, wherein the bore of the sleeve includes a diameter larger than a diameter of the first aperture and is adjacent to an end of the ratcheting lever.

2. The hammer of claim 1, wherein the spring-biased locking pin comprises a pin body having a first end and a second end, the first end positioned within the bore, the pin body extending through the first aperture and second aperture, the second end positioned outside of the sleeve and the ratcheting lever.

3. The hammer of claim 2, wherein the spring-biased locking pin further comprises a collar disposed around the second end of the pin body, the collar securing the pin body to the release arm and within the bore.

4. The hammer of claim 2, wherein the spring-biased locking pin further comprises a locking tooth disposed on the first end of the pin body for engaging any one of the plurality of apertures.

5. The hammer of claim 4, wherein each of the plurality of apertures includes a shape complimentary to the shape of the locking tooth to receive the locking tooth flush therein.

6. The hammer of claim 2, wherein the spring-biased locking pin further comprises a spring extending annularly around the pin body, the spring positioned within the bore between the first aperture and second end of the pin body, the spring biased toward a rear side of the elongated handle.

7. The hammer of claim 2, wherein:

upon depression of the release arm, the ratcheting lever pulls the pin body away from the elongated handle out of the bore and out of any one of the plurality of apertures, thereby releasing the claw assembly from the elongated handle; and upon release of the release arm, the pin body is driven back toward the elongated handle and into any one of the plurality of apertures, thereby securing the claw assembly in position along the elongated handle.

8. The hammer of claim 1, further comprising a grip extending annularly around the proximal end of the elongated handle, the plurality of apertures interspaced linearly along the length of the elongated handle between the distal end and the grip.

9. The hammer of claim 8, wherein the grip defines a stop shoulder extending annularly around the elongated handle, the stop shoulder including a diameter substantially equal to or larger than a diameter of the sleeve to stop the sleeve thereon.

10. The hammer of claim 1, wherein:

the claw body includes a top end, a bottom end, a proximal end, a distal end, and an inwardly extending recess disposed on the proximal end; and the head body a top end, a bottom end, a front end, a rear end, and a projection extending outwardly from the rear end, the projection slidably disposed within the recess to enable the claw body to slide linearly along the head body.

11. The hammer of claim 10, wherein the rear side of elongated handle is substantially the same size and shape as the projection such that the recess fits over the rear side of the elongated handle and slides thereover when the claw assembly is linearly adjusted along the length of the elongated handle.

12. The hammer of claim 1, wherein the head body includes a stop lip extending outwardly therefrom to stop the sleeve at the distal end of the elongated handle and align the claw assembly with the head assembly such that the claw body is flush with the head body.

13. The hammer of claim 1, wherein:

the plurality of apertures are evenly spaced apart and coplanar; and each of the plurality of apertures defines a distinct height adjustment of the claw assembly relative to the head assembly, such that when the spring-biased locking pin is engaged with any one of the plurality of apertures, the claw assembly is at a different height relative to the head assembly than when engaged with any of the other plurality of apertures.

14. The hammer of claim 1, wherein the ratcheting lever includes a flange extending outwardly from the first end.

* * * * *